INVENTOR.
CLARK V. BULLEN
BY
ATTORNEYS

INVENTOR.
CLARK V. BULLEN

United States Patent Office 2,931,577
Patented Apr. 5, 1960

2,931,577

IMPROVED MEANS FOR CREATING AND COMBINING SIGNAL COMPONENTS IN CONDITION CONTROL APPARATUS

Clark V. Bullen, Rockford, Ill., assignor to Barber-Colman Company, Rockford, Ill., a corporation of Illinois Application June 13, 1957, Serial No. 665,495

11 Claims. (Cl. 236—78)

This invention relates generally to an automatic control system for adjusting a final control means in one sense or the opposite sense to correct for deviations of a controlled condition such as temperature from a desired value. More particularly, the invention relates to a condition control system in which the adjustment of the final control means is effected in response to changes in a final control signal having one or more different components. The latter vary individually with different factors in the system and each results in a different action in the adjustment of the final means, for example, a proportioning action in which the adjustment of the final control means is directly proportional to deviation of the controlled condition from the desired value, a reset action in which the rate of adjustment is proportional to the deviation, or a rate action in which the adjustment is proportional to the rate of deviation of the controlled condition.

The primary object of the invention is to provide an improved control system in which the various components of the final control signal are derived electrically and are combined in a novel manner to simplify the system and enable each of the control actions to be adjusted independently of the other actions.

Another object is to combine the various components in a modulator means which is constructed in a novel manner to separate the circuits for the components from each other so that adjustment of one component does not affect the adjustments of the other components.

A further object is to utilize a single source of power for obtaining all of the different components as permitted by separation of the circuits in the modulator means.

Still another object is to construct the modulator means in a novel manner to convert components of a unidirectional character into a final alternating current control signal without mechanically moving parts and, at the same time, to enable resistance and capacitance elements to be used for obtaining the rate and reset components.

A more detailed object is to construct the modulator means of two different modulators, a magnetic modulator of the saturable reactor type having a low impedance input and operating to add direct current signals and convert their sum to alternating current and a second modulator which is interposed between the magnetic modulator and the circuits for the rate and reset components to avoid low impedance shunts around the resistance and capacitance elements in these circuits.

Figure 1:
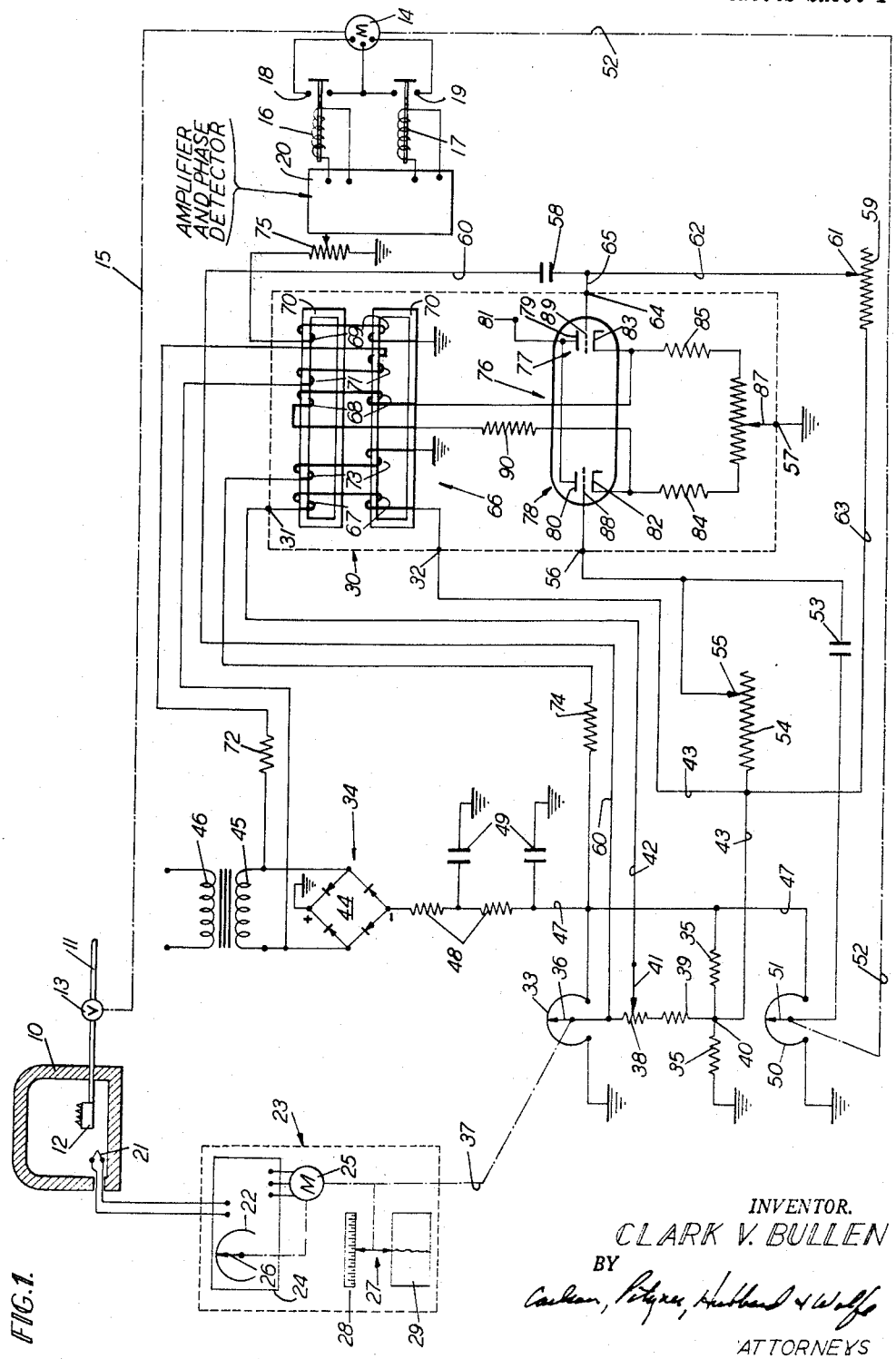

Other objects and advantages of the invention will become apparent from the following detailed description taken in connection with the accompanying drawings, in which Figure 1 is a schematic view and wiring diagram of an automatic control system embodying the novel features of the present invention.

Figure 2:
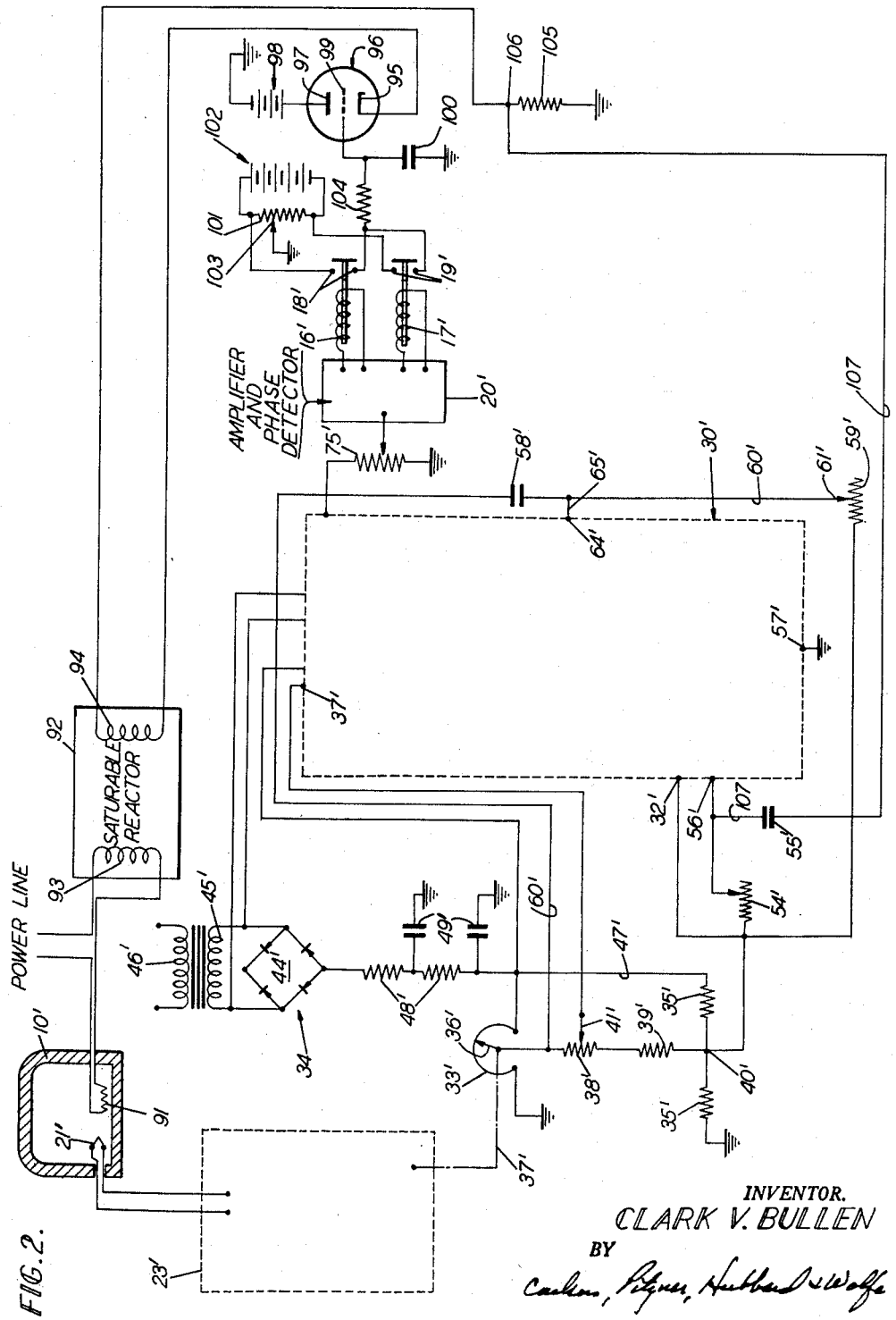

Fig. 2 is a schematic view and wiring diagram of a modified control system.

The present invention is especially suited for the automatic control of a variable condition of a controlled medium by adjusting a final control means in opposite senses to regulate the delivery of a control agent and thereby correct for deviations of the condition from a desired value. While the invention is applicable to the control of various conditions such as temperature, pressure or flow, I have shown in the drawings and herein will describe in detail two systems of the so-called proportioning type for regulating the temperature of the atmosphere within a furnace 10. It is to be understood, however, that I do not intend to limit the invention by such disclosures, but aim to cover all modifications and alternative constructions falling within the spirit and scope of the invention as expressed in the appended claims.

In the preferred system of Fig. 1, the control agent is fuel which flows through a supply line 11 to a burner 12 within the furnace 10. The final control means is a valve 13 located in the supply line and movable between open and closed positions to regulate the fuel flow. Adjustment of the valve position is effected by a reversible electric motor 14 through a suitable drive connection 15. The motor operates to shift the valve in opposite directions upon energization of one or the other of two relays 16 and 17 having contacts 18 and 19 connected respectively in forward and reverse motor control circuits.

The motor relays 16 and 17 are energized selectively in response to changes of a final alternating current control signal which varies in phase and amplitude with changes in the furnace temperature. This signal is applied to the relays through a suitable amplifier and phase detector unit 20. If the furnace temperature deviates in one direction, for example, above the desired value, the signal is of the proper phase to energize one of the relays for shifting the valve 13 toward its closed position. A deviation of the temperature below the desired value results in a signal of the opposite phase for energizing the other relay and operating the motor to shift the valve toward its open position.

Variations of the temperature within the furnace 10 are sensed by a thermocouple 21 whose unidirectional voltage is applied in opposition to a similar voltage derived from a slidewire 22 in a self-balancing potentiometer recorder 23 of well known construction. Differences between the thermocouple and slidewire voltages due to changes in the temperature are amplified in a control unit 24 which varies the energization of a motor 25 to adjust the slider 26 of the slidewire in a rebalancing direction until the voltages are equal. Along with the slider adjustment, a pen-indicator 27 driven by the motor is shifted relative to a scale 28 and a separately driven chart 29 to indicate and record the value of the furnace temperature continuously.

Depending on the type of controller action desired, the final control signal includes more than one component each having a different effect on the adjustment of the valve 13 when the furnace temperature changes. One such component varies linearly with the error or deviation of the furnace temperature from the desired valve. This error component tends to produce a proportioning action in which the position of the valve, normally expressed as a percentage of the range between its fully open and fully closed positions, changes as a linear function of changes of the furnace temperature. In other words, the valve is positioned between its open and closed positions in proportion to the magnitude of the furnace temperature. The range over which the furnace temperature must change for movement of the valve from one of its limit positions to the other is known as the proportioning band. This is expressed as a percentage of the total range of the potentiometer recorder 23. For example, if the potentiometer recorder has a range of zero degrees to 2000 degrees and the proportioning band is twenty percent, a furnace temperature change of 400 degrees is required for movement of the valve through its full range.

Another component of the final control signal tends to rebalance the system following an unbalance due to a change of the error or proportioning component and, in addition, provides an automatic reset action which also is known as reset rate, droop correction, or proportional-speed floating action. This component is proportional to the time integral of the deviation of the furnace temperature from the desired value and its effect is variation of the rate of change of the valve position in proportion to the deviation. In this instance where the speed of the valve motor 14 is constant, the reset action is obtained by energizing the motor intermittently and varying the ratio of the lengths of the periods of energization to the lengths of the periods of deenergization so that the average rate of valve movement varies in proportion to the temperature deviation. Reset action is expressed as a number of repeats per minute, this number being found by dividing the motion of the valve 13 resulting from the reset action in one minute with a given temperature deviation by the valve motion resulting from the proportioning action in the same time and with the same deviation.

A third component of the final control signal provides rate action which also is referred to as rate time or rate response and normally is combined with proportioning action alone or with both proportioning and reset actions. The rate component tends to cause the valve position to vary as a linear function of the rate of change of the furnace temperature so that the effect of the proportioning action on the valve position is advanced or retarded depending on the direction of change of the furnace temperature. Rate action is expressed in minutes and is determined by subtracting the time required for a given motion of the valve due to combined effect of proportioning and rate actions from the time required for the same motion due to the effect of proportioning action alone, the furnace temperature varying at the same rate in both cases.

In accordance with the present invention, the various components of the final control signal are derived from separate circuits in a novel manner contributing to the simplicity and low cost of the control system and enabling the value of each of the rate and reset components to be adjusted independently and without directly affecting the value of the other component. The use of such separate circuits is made possible by the provision of a modulator means 30 having a separate input circuit for each component and operable to combine the electrical effects of the components to form the final control signal while maintaining the individual component circuits isolated from each other. Also, where the components are unidirectional as in this instance, the modulator means converts the algebraic sum of the effects of the components to the final alternating current control signal and varies the phase and amplitude of this signal with changes in the polarity and magnitude of such sum.

The proportioning component of the final control signal is applied between two input terminals 31 and 32 of the modulator means 30 and is derived from a potentiometer comprising a control slidewire 33 connected across a current source 34 and in parallel with two series connected resistors 35 of equal value. The slider 36 of the slidewire is driven by the potentiometer recorder motor 25 through a suitable drive connection 37. A variable proportioning band resistor 38 is connected in series with a fixed resistor 39 between the slider and the junction 40 of the divider resistors. The proportioning signal proper which appears as the voltage between this junction and an adjustable tap 41 of the proportioning band resistor is applied to the input terminals of the modulator means by conductors 42 and 43.

To permit the use of resistance and capacitance elements in obtaining the reset and rate components of the final control signal, the source 34 supplies direct current. In the present instance, the source includes a full wave rectifier 44 having its input terminals connected to opposite ends of the secondary winding 45 of a step-down transformer whose primary 46 is energized from a suitable alternating current supply (not shown). The positive output terminal of the rectifier is grounded and the negative terminal is connected to a supply conductor 47 through resistors 48 which cooperate with capacitors 49 to smooth the rectifier output. The voltage divider resistors 35 and the control slidewire 36 are connected between this supply conductor and ground.

With the above arrangement for obtaining the proportioning component, the latter is equal to zero when the slider 36 is in the center of the control slidewire. This is because the potential of the slider equals the potential of the junction 40 between the divider resistors 35. When the slider is shifted to either side of the center position, the proportioning component varies in polarity and magnitude with the direction and amount of the shift. The center position of the slider thus corresponds to the desired value of the controlled temperature. To enable this value to be changed, the slidewire is mounted in a suitable manner for adjustment relative to the slider. The proportioning band is changed simply by adjusting the tap 41 on the proportioning band resistor 38, the band decreasing as the tap is moved closer to the slider.

The reset component of the final control signal is obtained in this instance in response to adjustment of the final control means. Where the latter is a part such as the valve 13 of Fig. 1 having motion, the reset component is derived from another slidewire 50 having its slider 51 driven by the valve adjusting motor 14 through a suitable connection 52. To simplify the control system, the same source 34 which supplies direct current to the control slidewire 33 for the proportioning component is utilized to supply current to the valve slidewire for the reset component. Such use of a single power supply for both slidewires is made possible by the provision in the modulator means 30 of an input circuit for the reset component separate from the circuit for the proportioning component.

To couple the valve slidewire 50 to the common source 34, the slidewire herein is connected in parallel with the two divider resistors 35 between the supply conductor 47 and ground. Thus, it forms with these resistors a potentiometer similar to that of the control slidewire 33. The potential of the slider 51 relative to the resistor junction 40 changes with adjustments of the slider and is modified by a reset capacitor 53 and a variable reset resistor 54 to provide the reset component. For this purpose, the capacitor and the resistor are connected in series between the slider and the conductor 43 leading to the resistor junction. With this arrangement, changes in the potential between the junction and the slider caused by adjustment of the latter with the valve 13 result in charging or discharging of the capacitor depending on the direction of the slider shift. Discharge takes place in a circuit extending from the capacitor in series through an adjustable tap 55 of the reset resistor 54, the part of this resistor between the tap and the conductor 43, the latter, the junction 40, one of the divider resistors 35, ground, and the portion of the slidewire 50 between ground and the slider 51.

The reset component is applied to the modulator means 30 by connecting a third input terminal 56 directly to the tap 55 of the reset resistor 54 and a fourth input terminal 57 to ground. The actual signal then applied to the modulator means is the voltage appearing across the reset resistor 54 and the divider resistor 35 in the capacitor discharge circuit. This signal varies not only with the potential variation in the circuit due to shifting of the slider 51 but also with the rate of charging and discharging which is determined by adjustment of the effective value of the reset resistor 54. In order to achieve the desired reset action, the reset resistor has a very high total resistance on the order of 70 megohms as compared to 47 ohms for each of the divider resistors and 100 ohms for the valve slidewire.

To obtain the rate component of the final control signal, changes in the potential between the slider 36 of the control slidewire 33 and the junction 40 of the divider resistors 35 are differentiated by a rate capacitor 58 and a variable rate resistor 59 connected in series between the slider and the junction. One side of the capacitor is connected by a conductor 60 directly to the slider and the other side is connected to a variable tap 61 of the rate resistor by a conductor 62. One end of the resistor then is connected by a conductor 63 and the conductor 43 to the resistor junction 40. With this arrangement, the discharge circuit for the capacitor extends in series from one side thereof through the rate resistor tap 61, the resistor 59, the conductors 63 and 43, the resistor junction 40, one of the divider resistors 35, ground, the portion of the control slidewire 33 between ground and the slider 36 and the conductor 60 to the other side of the capacitor. The rate of charging and discharge is determined by the adjustment of the rate resistor which herein has a total resistance on the order of 6 megohms.

The rate component is applied to the modulator means 30 between the grounded terminal 57 and a fifth input terminal 64 which is connected by a conductor 65 to the conductor 62 between the rate capacitor 58 and the rate resistor 59. With these connections, the actual signal applied to the modulator means is the potential drop across the rate resistor and the one of the divider resistors 35 connected between the junction 40 and ground.

As noted above, the modulator means 30, in addition to combining the various direct current components of the final control signal, also converts the sum of the components to alternating current. To perform both of these functions without moving parts subject to wear and, also, to maintain each of its various input circuits isolated from current flow in the others, the modulator means includes a magnetic modulator 66. The latter comprises independent input or control windings 67 and 68 to which the direct current components are applied and an output winding 69 in which is induced an alternating voltage variable in phase and amplitude with changes in the sum of the direct currents in the input windings.

In the present instance, the magnetic modulator 66 comprises two substantially identical saturable reactor cores 70 and each of the input and output windings is formed in two series connected sections each wound on a different core. Alternating current flux in the respective cores is derived from current flowing in separate sections of an energizing winding 71 connected across the secondary winding 45 of the transformer in series with a resistor 72 having a value of approximately 2200 ohms for maintaining the current in the energizing winding of substantially constant phase and amplitude. The directions of winding of the different sections of the output and energizing windings on the two cores are such that the voltages induced in the respective output sections are of opposite phase and equal amplitude when the reluctances of the cores are equal. For example, the output sections may be wound in so-called series opposing relation while the energizing sections are wound in series adding relation.

The level of reluctance in each of the cores 70 is determined by the amount of direct current flowing in the input windings 67 and 68 and in a direct current bias winding 73. The latter is connected in series with a resistor 74 across the direct current source 34 and the current flow therein is of sufficient magnitude to saturate the cores to the steepest parts of their magnetization or B—H curves. To vary the reluctance of the cores and thus the voltage in the sections of the output winding with changes of the direct current in the input windings, the two sections of each of the latter are wound on the cores so that the resulting flux in one core aids that of the bias winding and, in the other core, opposes the bias flux. The final control signal appears as the voltage across the tapped portion of a variable gain control resistor 75 connected in a series with the output winding and having an adjustable tap connected to the amplifier and detector unit 20.

The flux level in the cores 70 is varied with changes of the proportioning component of the final control signal simply by connecting one input winding 67 of the magnetic modulator 66 between the first and second input terminals 31 and 32 of the modulator means 30. This input winding thus constitutes one of the separate input circuits of the modulator means. The other components of the final control signal, however, are not applied directly to an input winding of the magnetic modulator. This is because the impedance of such a winding is very low compared with that of each of the rate and reset resistors 59 and 54. Thus, connection of input windings between the third and fourth input terminals 56 and 57 and between the fourth and fifth terminals 57 and 64 would have the same effect as short circuiting of the rate and reset resistors and consequent loss of control over the rates of charging and discharging of the rate and reset capacitors 58 and 53.

To permit the use of the magnetic modulator 66 with its low impedance input windings 67 and 68 and still maintain the rate and reset resistors 59 and 54 effectual in the charging and discharging circiuits of the capacitors 58 and 53, a second modulator 76 is interposed between the magnetic modulator and the input terminals 56, 57 and 64 for the rate and reset components. The second modulator operates to combine the rate and reset components while maintaining the circuits for these signals isolated from each other. Also, between the input terminals for each of the rate and reset components, it presents a very high impedance to avoid a low impedance shunt of the rate and reset resistors and thereby retain control of the capacitor charging and discharge circuits. The second modulator output which varies with the algebraic sum of the rate and reset components is applied to the second input winding 68 of the magnetic modulator.

The desired isolation and high impedance of the rate and reset input circuits of the modulator means 30 are obtained by forming the second modulator 76 as a balanced cathode follower comprising two triodes 77 and 78. The plates 79 and 80 of the latter are connected to each other and to the positive terminal 81 of a suitable direct current plate supply (not shown) having a grounded negative terminal. The two cathodes 82 and 83 are connected through their respective series bias resistors 84 and 85 to opposite ends of a balancing resistor 86 having a variable tap 87 connected to the ground input terminal 57 of the modulator means. This tap is adjusted to compensate for differences in the triodes and keep the potentials of the cathodes equal when the grid potentials are equal. To vary the potentials of the cathodes individually with variations of the respective reset and rate components of the final control signal, the grid 88 of the reset triode is connected to the third input terminal 56 of the modulator means and the other grid 89 is connected to the fifth input terminal 64.

Since the potentials of the two cathodes 82 and 83 vary individually with the respective reset and rate components, the signal appearing between the cathodes is proportional to the algebraic sum of these components. This signal is utilized to vary the flux level in the saturable cores 70 by connecting the second input winding 68 of the magnetic modulator 66 in series with a resistor 90 between the cathodes.

With the above cathode follower connections, the input circuit for the reset component of the final control signal extends from the third input terminal 56 of the modulator means 30 to the grid 88 of the reset triode 78 and from the cathode 82 to the grounded terminal 57 through the bias resistor 84 and a part of the balancing resistor 86. This circuit includes the impedance between the grid and cathode, such impedance being very high, that is, on the order of several hundred megohms. The input circuit for the rate component extending between the fifth input terminal 64 and the grounded terminal 57 similarly includes the high grid-cathode impedance of the other triode 77. In view of these high impedances, the input circuits are effectually isolated from each other and low impedance shunts around the rate and reset resistors are avoided.

In the operation of the preferred control system of Fig. 1, let it be assumed that the temperature of the furnace 10 has been at the desired value for a sufficient time that the capacitors 53 and 58 are discharged to bring both grids 88 and 89 to the potential of the junction 40. The cathodes 82 and 83 then are at the same potential so that no current flows in the second input winding 68 of the magnetic modulator 66. Current flow in the first input winding 67 also is zero because the slider 36 of the control slidewire 33 is in its centered position. The voltages induced in the two sections of the output winding 69 then are of equal amplitude and opposite phase so that both motor control relays 16 and 17 are deenergized.

As soon as the furnace temperature changes, for example, increases, the recorder motor 25 shifts the slider 36 of the control slidewire 33 from the centered position in a corresponding direction and by an amount proportional to the temperature deviation. This results in a current flow in the first input winding 67 and a change in the flux levels in the two cores 70 so that different voltages are induced in the sections of the output winding 69 and one relay 16 is energized to complete the proper circuit of the motor 14 for closing the valve 13. With the polarity of the direct current source 34 as shown in Fig. 1, the slider 36 is shifted clockwise so that its potential becomes more negative than the potential of the divider resistor junction 40 and current flows upwardly through the first input winding. The amount of such current not only varies with the amount of slider shift but also depends on the adjustment of the tap 41 on the proportioning band resistor 38.

The motor 14 in operating to close the valve 13 also shifts the slider 51 of the valve slidewire 50 in a clockwise direction so that its potential becomes more negative than that of the divider resistor junction 40. Due to the long time constant of the reset capacitor 53 and resistor 54, the change of slider potential results in an immediate change in the potential of the grid 88 of the reset triode 78 and the cathode 82 thereof becomes more negative with respect to the cathode 83 of the rate triode 77. Assuming for the moment that the potential of the rate cathode 83 remains constant, the more negative potential of the reset cathode results in current flow in the second input winding 68 in the proper direction to oppose the proportioning current in the first input winding 67 and thus reduce the output current for the active relay 16. When the valve has been adjusted far enough toward the closed position that the effects of the currents in the two windings are substantially equal, the relay is deenergized and the valve motor stops.

As soon as the potential of the valve slider 51 changes due to operation of the valve motor 14, the reset capacitor 53 begins to charge in the proper direction to return the potentials of the reset grid 88 and cathode 82 to their original values. The running time of the motor is so short, however, compared to the time constant of the charging circuit that the capacitor is still substantially uncharged by the time the initial slider adjustment is completed. After a time interval depending on the setting of the reset resistor 54 and the deviation of the furnace temperature from the desired value, the negative potentials of the reset grid and cathode and thus the current in the second input winding 68 will have decreased and the output signal for the relay 16 will have increased sufficiently that the relay is reenergized to adjust the valve 13 farther in the closing direction. Such valve shift results in the same changes of the reset grid and cathode potentials and current flow in the second input winding 68 which occurred in response to the first valve shift. This intermittent running of the valve continues as long as the furnace temperature deviates from the desired value, the temperature changing with the valve position and eventually reaching the desired value where the corrective actions cease.

In the operation as described thus far, only the proportioning and reset components of the final control signal have been discussed, the potential of the rate cathode 83 having been assumed to be constant. Considering now this cathode, it becomes negative during the decrease of potential at the slider 36 of the control slidewire 33 due to the increase of furnace temperature from the desired value. Following such initial decrease, the potential of the rate cathode returns to its original value as the rate capacitor 58 becomes charged through the rate resistor 59, the rate of charging being determined by the adjustment of the resistor tap 61.

The decrease of potential of the rate cathode 83 occurs at approximately the same time as the decrease of potential of the reset cathode 82 and its effect is to reduce the current which otherwise would flow in the second input winding 68 due to the proportioning component alone. The valve 13 then must be adjusted farther before the magnetomotive force in the cores 70 due to the proportioning current is balanced and the valve motor 14 stops. The rate component thus results in advance of the valve position beyond what it otherwise would be. Since the rate capacitor 58 and resistor 59 form a differentiating circuit, the amount of such valve advance is determined by the rate of change of the furnace temperature as well as by the adjustment of the resistor. In the case where the furnace temperature is decreasing, the effect of the rate component is reversed so that it retards the valve adjustment due to the proportioning and reset components.

After the initial deviation of the furnace temperature from the desired value and the corrective adjustments of the valve 13 following such deviation, the various components of the final control signal continue to change with their different controlling factors to restore the controlled condition and maintain it at the desired value. If it is desired to adjust the effect of any one component, this is done simply by changing the value of the associated variable resistor, that is, either the proportioning band resistor 38 or one of the rate and reset resistors 59 and 54. Due to the isolation of the circuits providing the different components as made possible by the separate input circuits of the modulator means 30, adjustment of the resistor for one component does not change the effective resistance in the circuits providing the other components. Thus, adjustments for one type of control action are independent of adjustments of the other actions.

By isolating the circuits for the different final control signal components, the modulator means 30 also makes it possible to use the same source 34 to supply direct current for obtaining the different voltage signals from the two slidewires 33 and 50. Since changes in the voltage of the source have a substantially equal effect on the voltages derived from the slidewires, the source requires no provisions for stablization against line voltage fluctuations. The source therefore is inexpensive and requires little maintenance. Maintenance of the modulator means 30 also is kept low by the provision of the magnetic modulator 66 which requires no moving parts for the conversion of direct current to alternating current. The second modulator 76 with its high impedance input circuits permits the use of the magnetic modulator while still avoiding low impedance shunts around the rate and reset resistors 59 and 54.

The modified control system of Fig. 2 is similar to that of Fig. 1 in construction and operation except for the final control means and the manner of obtaining the reset component of the final control signal, the parts of Fig. 2 which are the same as those of Fig. 1 bearing similar but primed reference characters. In the modified system, the final control agent is electrical current which flows through a resistance heating element 91 supported within the furnace 10'. Such current is supplied by a suitable saturable reactor 92 having an output winding 93 in series between an external source and the heating element. The amount of heating current varies with the current flowing in an input winding 94 which is connected in series with a resistor 105 between ground and the cathode 95 in the plate circuit of a vacuum triode 96, this circuit being completed by connecting the plate 97 to the positive terminal of a suitable direct current source 98 whose negative terminal is grounded. With this arrangement, the tube constitutes the final control means corresponding to the valve 13 of Fig. 1. Current flow through the tube and thus that in the heating element vary with changes in conductivity of the tube as determined by the potential of its control grid 99.

As in the preferred system, the alternating current final control signal from the modulator means 30' is applied to the amplifier and detector unit 20' for selective energization of the two relays 16' and 17'. To vary the potential of the grid 99 of the tube 96 with changes in the final control signal, the contacts 18' and 19' of the relays are used to complete separate charging and discharging circuits for a capacitor 100 connected between the grid and ground. Each of these circuits extends through a different part of a voltage divider 101 connected across a direct current source 102 and having a grounded tap 103 intermediate its ends adjacent the negative terminal of the source. When one relay 16' is energized, its contacts 18' close to complete the capacitor charging circuit which extends from ground in series through the capacitor 100, a resistor 104, the contacts 18', and the part of the divider resistor 101 between ground and the positive terminal of the source 102. Closure of the other relay contacts 19' completes the discharge circuit which extends in series from ground through the capacitor, the resistor 104, the contacts and that part of the divider resistor 101 between ground and the negative terminal of the source.

To obtain the reset component, the reset resistor 54' and capacitor 55' of the modified system modify a voltage which varies with changes in the conductivity of the tube 96, such changes corresponding to adjustments of the position of the valve 13 in the preferred system. Herein, the modified voltage is that appearing across the resistor 105 which is connected in series with the input winding 94 of the saturable reactor 92 and therefore carries the reactor input current flowing through the winding. The reset capacitor is connected by conductors 107 between the third input terminal 56' of the modulator means 30' and the junction 106 between the input winding 94 and the series resistor 105. The connection of the reset resistor 54' between this terminal and the junction 40' of the slidewire divider resistors 35' is the same as in Fig. 1. The other elements for the proportioning and rate components and their circuit connections are the same as in the preferred system.

I claim as my invention:

1. In a system including a final control element movable in opposite directions to change the value of a condition being controlled, the combination of, a first potentiometer circuit including a source of direct current and providing a first direct current signal variable with changes in the value of said condition, a second potentiometer circuit including said source and providing a second direct current signal variable with changes in the position of said control element, a magnetic modulator having first and second low impedance input windings isolated electrically from each other, said modulator providing an alternating current output signal variable in phase and amplitude with changes in polarity and magnitude of the algebraic sum of direct current signals applied to said input windings, a connection between said first potentiometer circuit and said first input winding for applying to the latter a direct current signal proportional to said first signal, a double cathode follower having first and second high impedance input circuits isolated from each other and an output circuit connected to said second input winding, a capacitance and a high resistance circuit connected to said second potentiometer circuit and said first input circuit and applying to the latter a reset signal variable with changes in said second signal, a capacitance and high resistance circuit connected to said first potentiometer circuit and said second input circuit and applying to the latter a rate signal variable with changes in said first signal, and reversible power actuator means operable to move said control element in response to said modulator output signal.

2. In a system including a final control element movable in opposite directions to change the value of a condition being controlled, the combination of, a first potentiometer circuit including a source of direct current and providing a first direct current signal variable with changes in the value of said condition, a second potentiometer circuit including said source and providing a second direct current signal variable with changes in the position of said control element, a magnetic modulator having first and second low impedance input windings isolated electrically from each other, said modulator providing an alternating current output signal variable in phase and amplitude with changes in polarity and magnitude of the algebraic sum of direct current signals applied to said input windings, a connection between said first potentiometer circuit and said first input winding for applying to the latter a direct current signal proportional to said first signal, a second modulator having an output and a high impedance input and providing a direct current output signal variable with changes in direct current signals applied to the input, a capacitance and high resistance circuit connected to said second potentiometer circuit and said second modulator input and applying to the latter a reset signal variable with changes in said second signal, a connection for applying said second modulator output signal to said second input winding of said magnetic modulator, and reversible power actuator means operable to move said control element in opposite directions in response to said magnetic modulator output signal.

3. In a system having a final control element movable in opposite directions to vary the value of a controlled condition, the combination of, a first potentiometer circuit connected to a source of a direct current and providing a first voltage signal variable in accordance with changes in said controlled condition, a second potentiometer circuit connected to said source and providing a second voltage signal variable in accordance with changes in the position of said control element, a first modulator having an input and providing an alternating current output signal variable in phase and amplitude in accordance with changes in the polarity and magnitude of the algebraic sum of direct current signals applied to the input, a second modulator having two input circuits isolated from each other, a connection between said first potentiometer circuit and one of said input circuits operable to apply to the circuit a rate signal variable with changes in said first signal, a connection between said second potentiometer circuit and the other of said input circuits for applying to the circuit a reset signal variable with changes in said second signal, said second modulator providing a direct current output signal proportional to the algebraic sum of said rate and reset signals, separate connections for applying to said first modulator input said second modulator output signal and a direct current signal proportional to said first signal, and reversible power actuator means selectively operable to move said control element in response to said first modulator output signal.

4. In a system including a final control element movable in opposite directions to vary the value of a controlled condition, the combination of, means providing a source of direct current, first potentiometer means connected to said source and cooperating therewith to provide a first direct current signal variable in accordance with changes in the value of said condition, second potentiometer means connected to said source and cooperating therewith to provide a second direct current signal variable in accordance with changes in the position of said control element, modulator means having three input circuits isolated from each other, two separate connections between said first potentiometer means and two of said modulator input circuits for applying to the latter different proportional and rate signals variable with said first signal, a third connection separate from said two connections and extending between said second potentiometer means and the third one of said modulator input circuits to apply to the latter a reset signal variable with changes in said second signal, said modulator means providing an alternating current output signal variable in phase and amplitude in accordance with changes in the polarity and magnitude of the algebraic sum of said proportional, rate and reset signals applied to said input circuits, and means selectively operable in response to said control element in the proper direction to correct for deviation of said controlled condition from a desired value.

5. In a system including a final control element movable in opposite directions to vary the value of a controlled condition, the combination of, means providing a source of direct current, first potentiometer means connected to said source and cooperating therewith to provide a first direct current signal variable in accordance with changes in the value of said condition, second potentiometer means connected to said source and cooperating therewith to provide a second direct current signal variable in accordance with changes in the position of said control element, modulator means having first and second input circuits isolated from each other, a connection between said first potentiometer means and said first modulator input circuit for applying to the latter a direct current signal proportional to said first signal, a circuit including resistance and capacitance elements and connected to said second potentiometer means and said second modulator input circuit to apply to the latter a reset signal variable with changes in said second signal, said modulator means providing an alternating current output signal variable in phase and amplitude in accordance with changes in the polarity and magnitude of the algebraic sum of said proportional and reset signals applied to said input circuits, and means selectively operable in response to said output signal of said modulator means to adjust said control element in the proper direction to correct for deviation of said controlled condition from a desired value.

6. In a system including a final control element movable in opposite directions to vary the value of a controlled condition, the combination of, means providing a current source, first potentiometer means connected to said source and cooperating therewith to provide a first signal variable in accordance with changes in the value of said condition, second potentiometer means connected to said source and cooperating therewith to provide a second signal variable in accordance with changes in the position of said control element, modulator means having first and second input circuits isolated from each other, a connection between said first potentiometer means and said first modulator input circuit for applying to the latter a first control signal variable with changes in said first signal, a circuit connected to said second potentiometer means and said second modulator input circuit to apply to the latter another control signal variable with changes in said second signal, said modulator means providing an output signal variable with changes in the polarity and magnitude of the algebraic sum of said control signals applied to said input circuits, and means selectively operable in response to said output signal of said modulator means to adjust said control element in the proper direction to correct for deviation of said controlled condition from a desired value.

7. In a system having final control means adjustable in opposite senses to vary the value of a controlled condition, the combination of, means providing a first signal variable in accordance with changes in the controlled condition, means providing a second signal variable in accordance with changes in the adjustment of said control means, a magnetic modulator having a low impedance input and providing an alternating current output signal variable with changes in the algebraic sum of direct current signals applied to the input, a connection between said first signal means and said modulator input for applying to the latter a signal proportional to said first signal, a second modulator having an output and two high impedance input circuits, a high impedance resistance-capacitance circuit connected to said second signal means and one of said second modulator input circuits for applying to the modulator circuit a reset signal variable with changes in said second signal, a high impedance resistance-capacitance circuit connected to said first signal means and the other of said second modulator input circuits for applying to the modulator circuit a rate signal variable with changes in said first signal, said second modulator providing an output signal proportional to the algebraic sum of said rate and reset signals, a connection for applying said second modulator output signal to said magnetic modulator input, and means selectively operable to adjust said final control means in opposite senses in response to said magnetic modulator output signal.

8. In a system having a final control means adjustable in opposite senses to change the value of a condition being controlled, the combination of, first signal means providing a first direct current signal variable with changes in said condition, second signal means providing a second direct current signal variable with changes in the adjustment of said control means, a magnetic modulator having first and second low impedance input windings and providing an alternating current output signal variable in phase and amplitude in accordance with changes in the polarity and magnitude of the algebraic sum of direct current signals applied to the windings, a connection between said first signal means and said first winding for applying to the latter a signal proportional to said first signal, a second modulator having an output and a high impedance input and providing a direct current output signal variable with changes in direct current signals applied to the input, a connection for applying said second modulator output signal to said second input winding, a high impedance resistance-capacitance circuit connected to one of said signal means and providing a control signal variable in accordance with changes in the corresponding one of said first and second signals, a connection for applying said control signal to said second modulator input, means selectively operable to adjust said final control means in opposite senses in response to said magnetic modulator output signal.

9. In a system including a final control means adjustable in opposite senses to change the value of a condition being controlled, the combination of, first signal means providing a first direct current signal variable with changes in the value of said condition, second signal means providing a second direct current signal variable with changes in the adjustment of said control means, a first modulator having first and second low impedance input circuits and providing an alternating current output signal variable in phase and amplitude with changes in polarity and magnitude of the algebraic sum of direct current signals applied to the input circuits, a second modulator having a high impedance input circuit and providing a direct current output signal variable with changes of a direct current signal applied to the input circuit, a connection extending between said first signal means and said first input circuit of said first modulator to apply to the circuit a direct current signal proportional to said first signal, a connection for applying said second modulator output signal to said second input circuit of said first modulator, a high impedance resistance-capacitance circuit connected to said second signal means and providing a reset control signal, a connection for applying said reset signal to said input circuit of said second modulator, and means selectively operable to adjust said final control means in opposite senses to vary said condition in response to said first modulator output signal.

10. In a system including a final control means adjustable in opposite senses to vary the value of a controlled condition, the combination of, first signal means providing a first direct current signal variable with changes in the value of said condition, second signal means providing a second direct current signal variable with adjustments of said control means, a first modulator having a low impedance input and providing an alternating current output signal variable in phase and amplitude with changes in the polarity and magnitude of a direct current signal applied to the input, a connection for applying said first signal to said input, a second modulator having a high impedance input and providing a direct current output signal variable with changes in a direct current signal applied to the input, a high impedance resistance-capacitance circuit connected to one of said signal means and providing a direct current control signal variable with changes in the corresponding one of said first and second signals, a connection for applying said control signal to said second modulator input, a connection for applying said second modulator output signal to said input of said first modulator, and means selectively operable in response to said output signal of said first modulator to adjust said control means in the proper sense to correct for deviation of said controlled condition from a desired value.

11. In a system including a final control means adjustable in opposite senses to vary the value of a controlled condition, the combination of, signal means providing a first direct current signal variable with changes in the value of said condition, a first modulator having a low impedance input and providing an alternating current output signal variable in phase and amplitude with changes in the polarity and magnitude of a direct current signal applied to the input, a connection for applying said first signal to said input, a second modulator having a high impedance input and providing a direct current output signal variable with changes in a direct current signal applied to the input, a circuit having capacitance and high resistance elements and providing a direct current control signal, a connection between said circuit and said input of said second modulator for applying said control signal to the input while avoiding a low impedance shunt around said resistance element, a connection for applying said second modulator output signal to said input of said first modulator, and means selectively operable in response to said output signal of said first modulator to adjust said control means in the proper sense to correct for deviation of said controlled condition from a desired value.

References Cited in the file of this patent
UNITED STATES PATENTS

| | | |
|---|---|---|
| 2,496,860 | Davis | Feb. 7, 1950 |
| 2,703,679 | Shank et al. | Mar. 8, 1955 |
| 2,810,526 | Rogers | Oct. 22, 1957 |